(12) United States Patent
Takeuchi et al.

(10) Patent No.: US 10,656,361 B2
(45) Date of Patent: May 19, 2020

(54) CABLE TERMINATION ASSEMBLY

(71) Applicants: Go!Foton Holdings, Inc., Somerset, NJ (US); Kenichiro Takeuchi, North Brunswick, NJ (US); Haiguang Lu, Los Altos, CA (US)

(72) Inventors: Kenichiro Takeuchi, North Brunswick, NJ (US); Haiguang Lu, Los Altos, CA (US)

(73) Assignee: Go!Foton Holdings, Inc., Somerset, NJ (US)

( * ) Notice: Subject to any disclaimer, the term of this patent is extended or adjusted under 35 U.S.C. 154(b) by 0 days.

(21) Appl. No.: 16/325,330

(22) PCT Filed: May 4, 2018

(86) PCT No.: PCT/US2018/031219
§ 371 (c)(1),
(2) Date: Feb. 13, 2019

(87) PCT Pub. No.: WO2018/204864
PCT Pub. Date: Aug. 11, 2018

(65) Prior Publication Data
US 2020/0049920 A1    Feb. 13, 2020

Related U.S. Application Data

(60) Provisional application No. 62/501,639, filed on May 4, 2017.

(51) Int. Cl.
*G02B 6/44* (2006.01)

(52) U.S. Cl.
CPC ......... *G02B 6/4472* (2013.01); *G02B 6/4444* (2013.01)

(58) Field of Classification Search
CPC .................................................. G02B 6/4472
See application file for complete search history.

(56) References Cited

U.S. PATENT DOCUMENTS 9,323,020 B2 * 4/2016 Cao ...................... G02B 6/4441
10,281,670 B2 * 5/2019 Vaughn ................ G02B 6/4441
(Continued)

OTHER PUBLICATIONS

"FieldShield YOURx-Terminal: Installation Manual", Clearfield, Jul. 2017, 33 pages.
(Continued)

*Primary Examiner* — Rhonda S Peace
(74) *Attorney, Agent, or Firm* — Lerner, David, Littenberg, Krumholz & Mentlik, LLP

(57) ABSTRACT

An optical fiber termination system includes an optical fiber termination unit assembly, an enclosure, and a plurality of electronic or optical devices within the enclosure. The assembly includes a housing having an interior surface, a patch panel terminal coupled to the interior surface of the housing, an optical assembly, an input optical fiber, and a plurality of optical fibers. The input optical fiber extends into the housing to the optical signal assembly. The output optical fibers extend out of the housing from the patch panel terminal. The enclosure is separate from the housing. The optical signal assembly divides a light beam emitted from the optical signal assembly into a plurality of light beams that are received by the patch panel terminal. The output optical fibers are configured to convey respective light beams to any one or any combination of the plurality of electronic and optical devices in the enclosure.

21 Claims, 5 Drawing Sheets

(56) References Cited

U.S. PATENT DOCUMENTS

| | | |
|---|---|---|
| 2003/0103750 A1 | 6/2003 | Laporte et al. |
| 2004/0211774 A1 | 10/2004 | Daoud et al. |
| 2006/0093303 A1 | 5/2006 | Reagan et al. |
| 2010/0183276 A1 | 7/2010 | Smith |
| 2013/0064506 A1 | 3/2013 | Eberle, Jr. et al. |

OTHER PUBLICATIONS

"YOURx-Aerial Terminal—Patch and Splice", Clearfield, Aug. 31, 2018, 4 pages.
"YOURx-Aerial Terminal: Installation Manual", Clearfield, Sep. 2018, 29 pages.
"YOURx-Terminal", Clearfield, Oct. 29, 2018, 7 pages.
Excerpt of ISE Magazine, vol. 36, Issue 2 (Feb. 2018).
International Search Report for PCT/US18/31219 dated Aug. 1, 2018.
"Guide to Fiber Optics & Premises Cabling", The Fiber Optic Association, Inc., http://www.thefoa.org/tech/ref/OSP/term.html, 2015, 27 pages.

\* cited by examiner

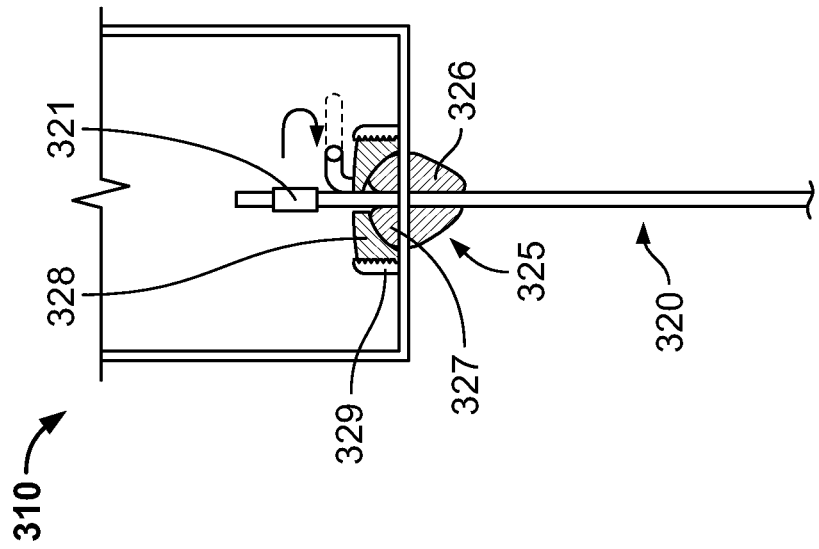
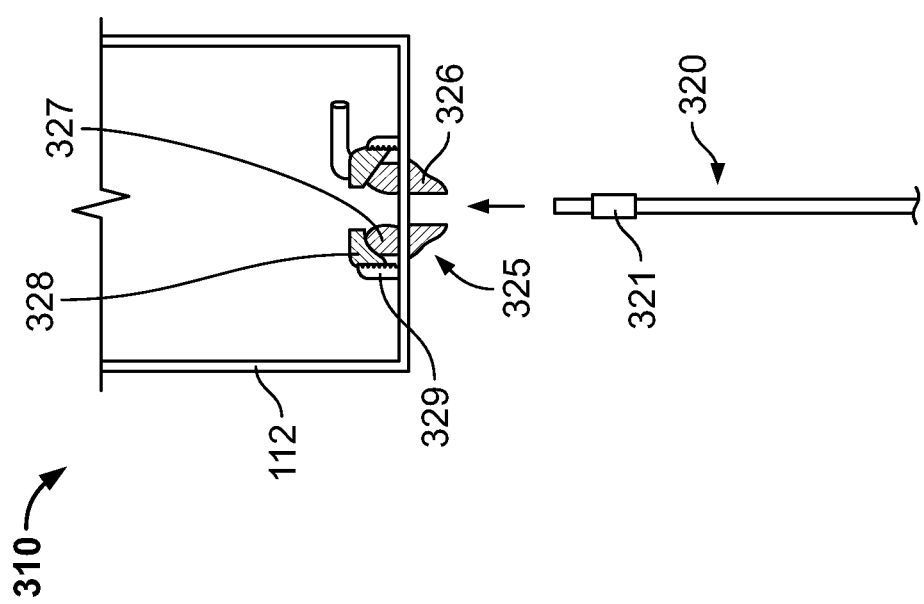

CABLE TERMINATION ASSEMBLY

CROSS-REFERENCE TO RELATED APPLICATIONS

The present application is a national phase entry under 35 U.S.C. § 371 of International Application No. PCT/US2018/031219, filed May 4, 2018, published as International Publication No. WO 2018/204864 A1, which claims the benefit of the filing date of U.S. Provisional Patent Application No. 62/501,639, filed May 4, 2017, the disclosures of which are hereby incorporated herein by reference.

FIELD

The present disclosure relates generally to optical systems and assemblies and, in particular, to the storage and environmental protection of such devices.

BACKGROUND

Outside plant (OSP) enclosures contain and provide protection for antenna units, kiosk terminals, and associated electronics equipment and wiring from harsh environmental factors such as sunlight, heat, wind, and rain. In hybrid arrangements, OSP enclosures further provide desired fiber optic distribution functionality by containing therein a plurality of optical fibers, splitters, multiplexers, patch panels, and the like interconnected with one another in a desired manner, adding complexity to the enclosures with limited available space and thus adding assembly costs. Further, the complexity and limited space in hybrid arrangements make maintenance and repairs on the OSPs more cumbersome. Hybrid arrangement OSPs also may be replaced prematurely when only a portion of such OSPs requires replacement, adding unnecessary costs.

Electronics engineers designing the antenna units and kiosk terminals generally are unaware of constraints imposed by having such components interconnected with the fiber optic distribution equipment to be contained within an enclosure, such as an OSP enclosure, and the components are not configured appropriately for such configuration. As such, the configuration of hybrid arrangements is not optimized for the limited space provided.

Accordingly, a better system is needed to accommodate and protect the components of hybrid arrangements of OSP enclosures.

BRIEF SUMMARY

In accordance with an aspect of the technology, an optical fiber cable and termination unit assembly may include a housing, a patch panel terminal, an optical signal assembly, an input optical fiber, and a plurality of output optical fibers. The housing may have an interior surface. The patch panel terminal may be coupled to the interior surface of the housing. The input optical fiber may extend into the housing to the optical signal assembly. The plurality of output optical fibers may extend out of the housing from the patch panel terminal. In this manner, the optical signal assembly may divide a light beam emitted from the optical signal assembly into a plurality of light beams that are received by the patch panel terminal.

In some arrangements, the assembly may include an output coupling element that may extend from the housing and may define a first longitudinal axis extending in directions towards and away from the housing. In such arrangements, the plurality of output optical fibers may extend through the output coupling element.

In some arrangements, the output coupling element may be substantially uniform in shape and size along a length of the output coupling element along the first longitudinal axis.

In some arrangements, the output coupling element may be tapered along a length of the output coupling element along the first longitudinal axis.

In some arrangements, the housing may define a first hole through which the plurality of output optical fibers may extend. In such arrangements, the output coupling element may contact the housing around an entire perimeter of the first hole to form a watertight seal at an interface of the output coupling element and the housing.

In some arrangements, the output coupling element may include a first flange, which may be an output coupling flange, extending from an end of the output coupling element in a direction transverse to the first longitudinal axis, and wherein an entire perimeter of the first flange is adhered to the interior surface of the housing to form the watertight seal.

In some arrangements, the output coupling element may be molded onto the housing around an entire perimeter of the first hole such that the output coupling element is inseparable from the housing without fracture of either one or both of the output coupling element and the housing.

In some arrangements, the plurality of output optical fibers may extend through an outer sheath. In such arrangements, the outer sheath may extend through the output coupling element.

In some arrangements, the output coupling element may include a neck that may be at a location spaced from the housing and that may have a smaller inner perimeter than other sections of the output coupling element. In this manner, the neck may conform to a perimeter of the outer sheath to form the watertight seal.

In some arrangements, the output coupling element may abut an exterior surface of the housing opposite the interior surface of the housing. In this manner, the output coupling element may be completely exterior to the housing, and the abutment of the output coupling element may form the watertight seal.

In some arrangements, the output coupling element may extend into the first hole defined by the housing.

In some arrangements, the output coupling element may define an output coupling groove, or simply "output groove," around an entire perimeter of the output coupling element. In such arrangements, the housing may extend into the output coupling groove at the first hole in an interference fit to form the watertight seal. In some such arrangements, a wall of the housing may have a housing wall thickness and may extend around the entire perimeter of the output coupling element. In such arrangements, a width of the output coupling groove in a direction a longitudinal axis of the output coupling element extends may be less than or equal to the housing wall thickness.

In some arrangements, the output coupling element may be made of rubber or plastic.

In some arrangements, the plurality of output optical fibers may extend through an outer sheath. In such arrangements, the outer sheath may extend through the output coupling element. In some such arrangements, the output coupling element may include an outer boot, an inner boot, an inner lock, and an outer lock ring. The outer boot may be in abutment against an exterior surface opposite the interior surface of the housing. The inner boot may be adjacent to the interior surface of the housing. The outer lock ring may be attached to the housing and may form a threaded connection with the inner lock ring. In this manner, upon threading the inner lock ring in a direction towards the housing, the inner boot may be compressed by the inner lock ring against the outer sheath of the output coupling element to form the watertight seal.

In some arrangements, the optical fiber cable and termination unit assembly may include an input coupling element that may extend from the housing and may define a second longitudinal axis extending in directions towards and away from the housing. In such arrangements, the input optical fiber may extend through the input coupling element.

In some arrangements, the housing may define a second hole through which the input optical fiber cable may extend. In such arrangements, the input coupling element may contact the housing around an entire perimeter of the second hole to form a watertight seal.

In some arrangements, the input coupling element may include a second flange, which may be an input coupling flange, extending from an end of the input coupling element in a direction transverse to the second longitudinal axis. In such arrangements, an entire perimeter of the second flange may be adhered to the interior surface of the housing to form the watertight seal.

In some arrangements, the input coupling element may be molded onto the housing around the entire perimeter of the second hole such that the input coupling element may be inseparable from the housing without fracture of either one or both of the input coupling element and the housing.

In some arrangements, the input coupling element may extend into the second hole defined by the housing.

In some arrangements, the input coupling element may define an input coupling groove, or simply "input groove," around an entire perimeter of the input coupling element. In such arrangements, the housing may extend into the input coupling groove at the second hole in an interference fit to form the watertight seal. In some such arrangements, a wall of the housing may have a housing wall thickness and may extend around the entire perimeter of the input coupling element. In such arrangements, a width of the input coupling groove in a direction a longitudinal axis of the input coupling element extends may be less than or equal to the housing wall thickness.

In some arrangements, the input coupling element may abut an exterior surface of the housing opposite the interior surface of the housing such that the input coupling element may be completely exterior to the housing, and the abutment of the input coupling element may form the watertight seal.

In some arrangements, the input optical fiber may extend through an outer sheath. In such arrangements, the outer sheath may extend through the input coupling element. In some such arrangements, the input coupling element may include an outer boot, an inner boot, an inner lock ring, and an outer lock ring. The outer boot may be in abutment against an exterior surface opposite the interior surface of the housing. The inner boot may be adjacent to the interior surface of the housing. The outer lock ring may be attached to the housing and may form a threaded connection with the inner lock ring. In this manner, upon threading the inner lock ring in a direction towards the housing, the inner boot may be compressed by the inner lock ring against the outer sheath of the input coupling element to form the watertight seal.

In some arrangements, the input coupling element may be made of rubber or plastic.

In some arrangements, the optical signal assembly may include an optical splitter or an optical wavelength division multiplexer.

In some arrangements, a plurality of intermediate optical fibers may be connected to the patch panel terminal and the optical signal assembly. In such arrangements, the plurality of light beams received by the patch panel terminal may travel along respective ones of the plurality of intermediate optical fibers.

In some arrangements, the cable and termination unit assembly may be an outside plant (OSP) cable assembly.

In accordance with another aspect of the technology, an optical fiber termination system may include an enclosure, a plurality of electronic or optical devices within the enclosure, and an optical fiber cable and termination unit assembly that may include a housing, a patch panel terminal, an optical signal assembly, an input optical fiber, and a plurality of output optical fibers. The enclosure may be separate from, i.e., adjacent to or spaced from, the housing of the optical fiber cable and termination unit assembly. The housing may have an interior surface. The patch panel terminal may be coupled to the interior surface of the housing. The input optical fiber may extend into the housing to the optical signal assembly. The plurality of output optical fibers may extend out of the housing from the patch panel terminal. In this manner, the optical signal assembly may divide a light beam emitted from the optical signal assembly into a plurality of light beams that are received by the patch panel terminal. The plurality of output optical fibers may be configured to convey respective light beams to any one or any combination of the plurality of electronic or optical devices in the enclosure.

In some arrangements, the plurality of electronic or optical devices may include any one or any combination of an antenna, a kiosk terminal, and an optical switch.

In some arrangements, the optical fiber cable and termination unit assembly may further include an output coupling element and an input coupling element that may both extend from the housing. In such arrangements, the plurality of output optical fibers may extend through the output coupling element, and the input optical fiber may extend through the input coupling element.

In some arrangements, the enclosure may include an enclosure hole. In such arrangements, the output coupling element may contact the enclosure around an entire perimeter of the enclosure hole to form a watertight seal at an interface of the output coupling element and the enclosure.

In some arrangements, the plurality of output optical fibers may extend through an outer sheath and a cable connector. In such arrangements, the outer sheath may extend through the output coupling element to the cable connector which may be attached to the enclosure.

In some arrangements, the output coupling element may include a neck at a location spaced from the housing and may have a smaller inner perimeter than other sections of the output coupling element. In this manner, the neck may conform to a perimeter of the outer sheath to form the watertight seal.

In accordance with another aspect of the technology, an optical fiber termination system may be assembled through a process. In this process, output optical fibers extending through an output optical fiber coupling may be attached to terminals within an enclosure. In such arrangements, the output optical fibers may be connected to a patch panel terminal within a housing outside the enclosure and may be optically connected to an input optical fiber extending into the housing. In the process, the output optical fiber coupling may be joined to the enclosure to form a watertight seal. Preferably, the output optical fiber coupling may be so joined subsequent to the attachment of the output optical fibers to the terminals within the enclosure.

BRIEF DESCRIPTION OF THE DRAWINGS

By way of description only, embodiments of the present disclosure are described herein with reference to the accompanying figures, in which:

FIGS. 4A and 4B are cross-sectional views of a portion of an optical fiber cable and termination unit assembly in accordance with another embodiment, prior to and after insertion of an optical fiber cable, respectively.

DETAILED DESCRIPTION

Figure 1A:
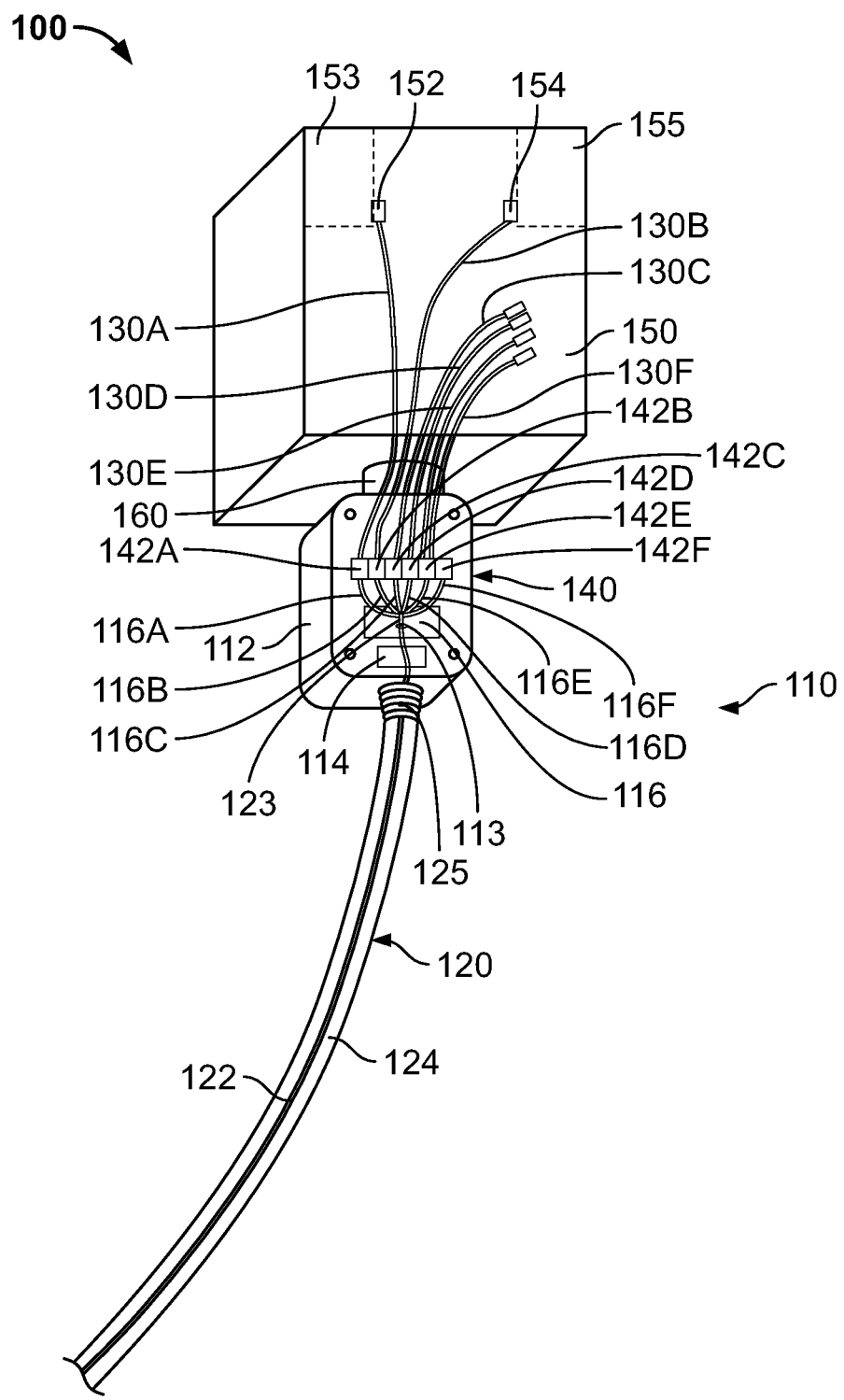
FIG. 1A is a perspective view of an optical fiber termination system in accordance with an embodiment.
Figure 1B:
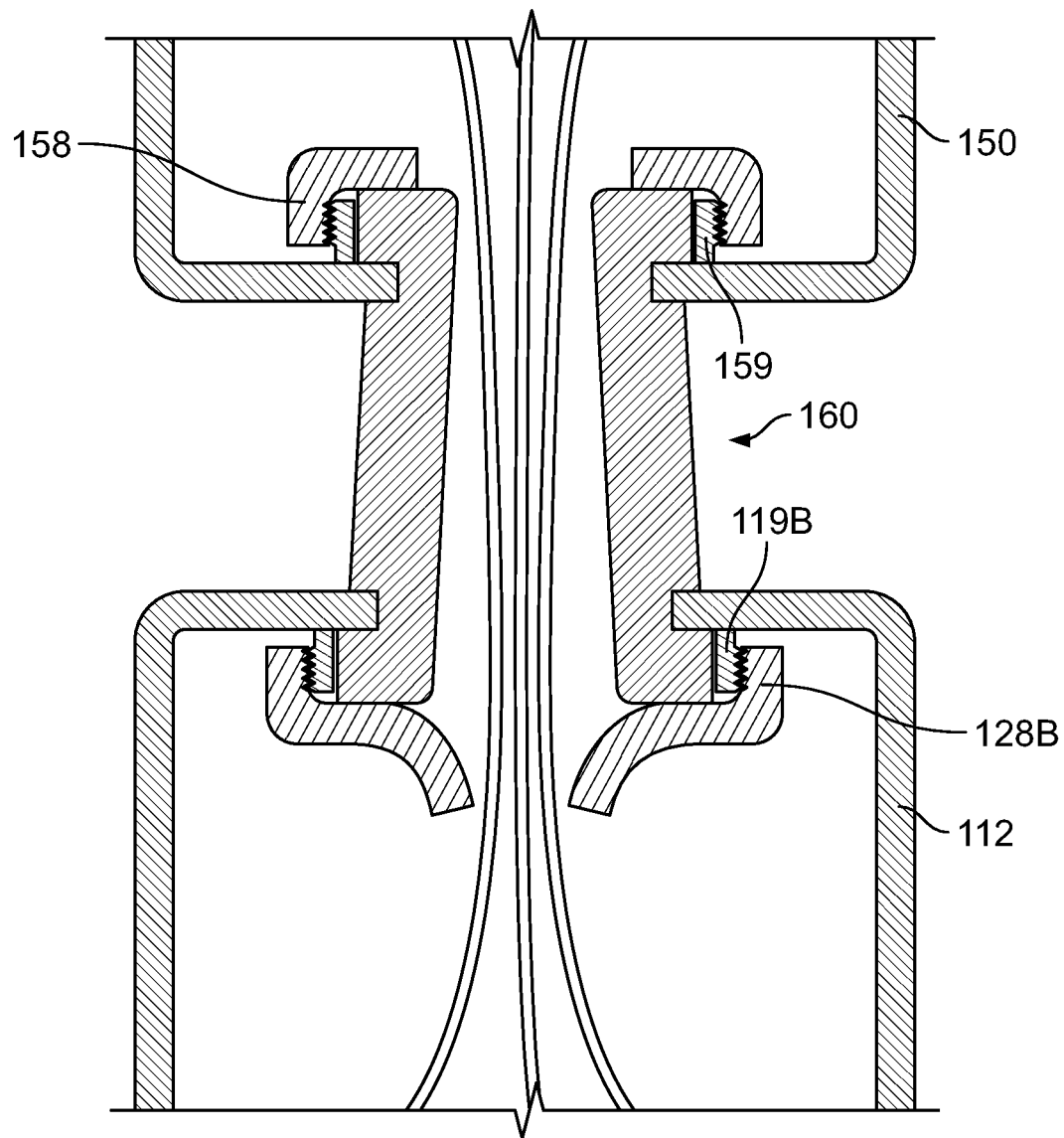
FIG. 1B is a partial cross-sectional view of a portion of the optical fiber termination system of FIG. 1A.

Referring now to FIGS. 1A and 1B, optical fiber termination system 100 includes optical fiber cable and termination unit assembly 110 and enclosure 150. Assembly 110 generally includes housing 112, a plurality of optical devices enclosed by the housing, input optical fiber cable 120, and a plurality of output optical fibers 130A-130F. In the example shown, the plurality of optical devices includes optical splitter 116, which may be but is not limited to being a Fused Biconical Taper (FBT) splitter, a Planar Lightwave Circuit (PLC) splitter, a multiplexer, or other like function optical function device, and patch panel terminal 140. In one embodiment, the housing 112 may further include optical, optical/electronic or electronic devices coupled to the splitter 116, for performing optical and electronic signal processing based on signals obtained from an input optical signal from the cable 120.

Figure 3:
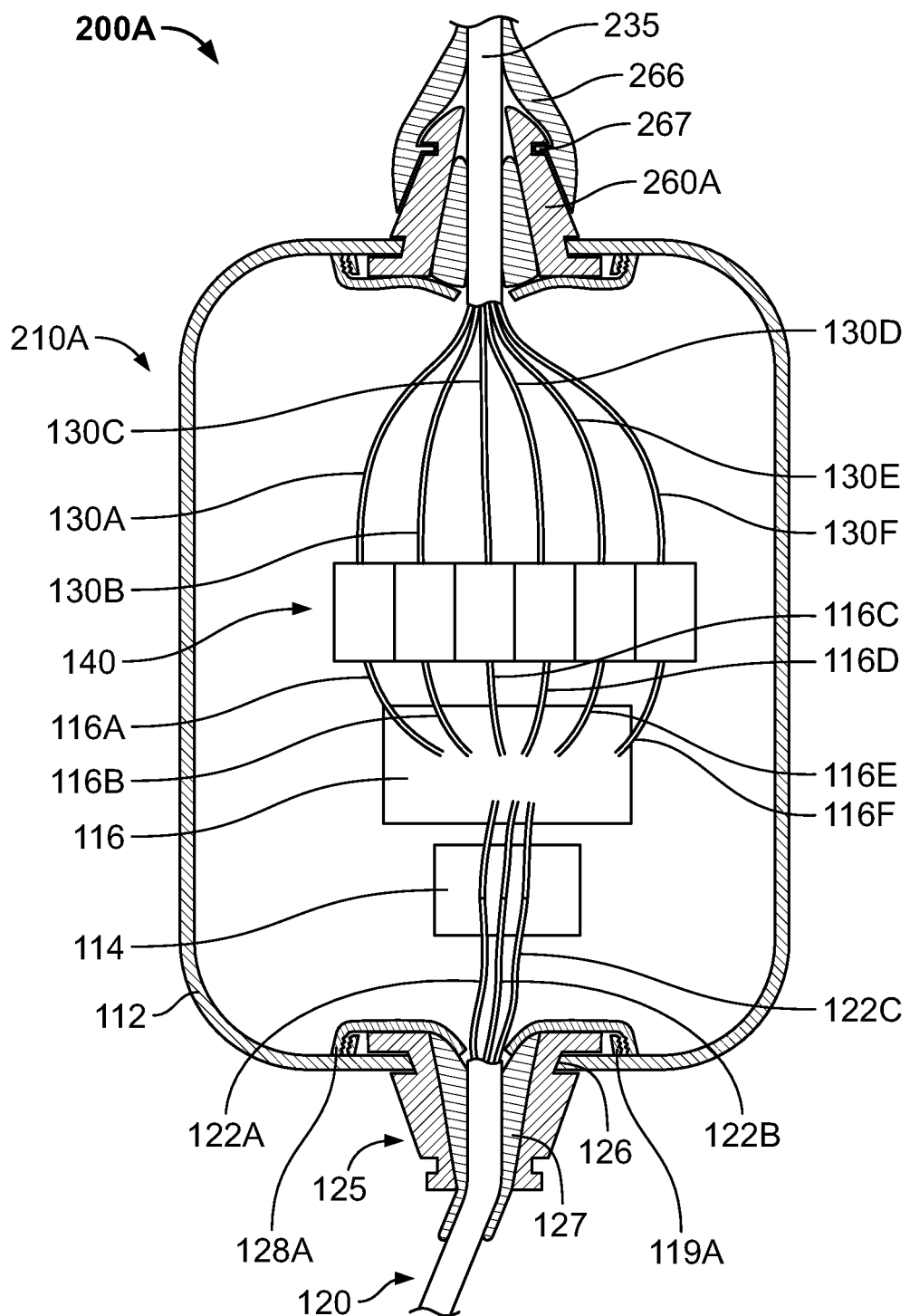
FIG. 3 is a partial cross-sectional view of an optical fiber termination system in accordance with another embodiment.

Input optical fiber cable 120 includes input optical fiber 122 and input outer sheath 124 surrounding a majority of the length of the optical fiber. As in this example, input optical fiber cable 120 may be an outside plant (OSP) cable. As shown, input optical fiber 122 extends into housing 112 where it is mated to another optical fiber 123, which may be pre-installed in housing 112, at junction 113 by input mating device 114 such as by mechanical or fusion splicing when the input mating device is a splicer or by a mating connection through an adapter or other terminal connection when the input mating device is a terminal. As shown, optical fiber 123 may be connected to optical splitter 116. In some arrangements, input optical fiber 122 may be a plurality of input optical fibers (e.g., plurality of input optical fibers 122A-122C as shown in FIG. 3) which may be spliced or otherwise form a mating connection as just described to corresponding optical fibers that are connected to optical splitter 116. In such arrangements (not shown), an additional optical splitter may be used between mating device 114 and optical splitter 116 such that the plurality of fibers to which input optical fibers 122A-122C are directly connected are connected to a single optical fiber connected to optical splitter 116.

Optical splitter 116, which may be an N×M power splitter or wavelength (de) multiplexer, is a passive optical device that divides a light beam supplied from input optical fiber 122 (or alternatively, input mating device 114) into a plurality of divided beams on optical fibers 116A-116F. Terminals 142A-142F of patch panel terminal 140 may be oriented to receive respective optical fibers 116A-116F from optical splitter 116 (or in alternative arrangements divided beams in free space) and, in response to receiving the respective beams, may be configured to provide respective optical signals to the respective terminals. As further shown, the plurality of output optical fibers 130A-130F are connected between respective terminals 142A-142F of patch panel terminal 140 and fiber optic terminals (only fiber optic terminals 152, 154 are shown) in communication with respective electronic devices or equipment (only electronic devices 153, 155 are illustrated, in broken lines). Such electronic devices or equipment may be but are not limited to being an antenna unit or a kiosk terminal.

As shown in FIG. 3, input coupling tube or element 125 may act as a boot that covers a portion of input optical fiber cable 120, and in some instances input outer sheath 124, adjacent to the location at which input optical fiber 122 (or, in alternative arrangements as described previously herein, a plurality of input optical fibers 122A-122C) enters housing 112 through an input hole in the housing. Input coupling tube 125 may abut or nearly abut housing 112 in forming a watertight seal against the housing. As used in this application, a "watertight seal" is one that is compliant with IP68, corresponding to IEC Standard 60529. Input coupling tube 125, may be made of rubber, soft plastic such as an elastomeric material, and hard plastic, or a combination thereof. Input coupling tube 125 may be adhered, such as by epoxy, in one arrangement or may be molded in another arrangement about an entire perimeter of the input hole in the housing through which input optical fiber 122 enters. In such arrangements or another alternative arrangement as shown in FIG. 3, input coupling tube 125 may define a groove 126 on its end adjacent to the housing into which the portion of the housing defining the input hole may be seated. Groove 126 of input coupling tube 125 may have a width along a longitudinal axis of input coupling tube 125 that is less than or equal to a wall thickness at the portion of the housing defining the input hole such that an interference fit is created upon receipt of the housing in the groove of the input coupling tube to form the watertight seal. Other arrangements of forming a watertight seal known to those of ordinary skill in the art are also contemplated. Input coupling tube 125 may have a stiffness sufficient to prevent bending to preserve a minimum bending radius or twisting of input optical fiber 122. As further shown in FIG. 3, inner seal 127 extends between input coupling tube 125 and optical fiber cable 120. Inner seal 127 is preferably made of a rubber material and is more elastic than input coupling tube 125 to provide a watertight seal between inner seal 127 and optical fiber cable 120 and between inner seal 127 and input coupling tube 125. Flange 119A of housing 112 extends in a direction towards the interior of the housing and is threaded. Lock ring 128A is threaded onto flange 119A of housing 112 such that the lock ring compresses input coupling tube 125 against housing 112 and inner seal 127 against input coupling tube 125 as shown to provide an additional sealing configuration.

Output coupling tube or element 160 may act as a boot that covers a portion of the plurality of output optical fibers 130A-130F. Output coupling tube 160 may include multiple components which may be made of rubber, soft plastic such as an elastomeric material, and hard plastic, or a combination thereof. As in the example shown, output coupling tube 160 may be generally larger than input coupling tube 125 to accommodate the passage of the plurality of optical fibers 130A-130F as compared to the single input optical fiber 122 that passes through the input coupling tube. Output coupling tube 160 may interface with housing 112 in the same or substantially the same manner as input coupling tube 125. In this manner, output coupling tube 160 may abut or nearly abut housing 112 in forming a watertight seal against the housing about an entire perimeter of an output hole through the housing through which the plurality of output optical fibers 130A-130F extend. Additionally, output coupling tube 160 may interface with enclosure 150 in the same or substantially the same manner as it interfaces with housing 112. In this manner, output coupling tube 160 may abut or nearly abut enclosure 150 to form a watertight seal against the enclosure about an entire perimeter of an enclosure hole through the enclosure through which the plurality of output optical fibers 130A-130F further extend.

As shown in FIG. 1B, output coupling tube 160 is configured and attaches to housing 112 as well as enclosure 150 in the same manner as input coupling tube 125 attaches to housing 112 with the exception that no inner seal such as inner seal 127 is used with output coupling tube 160 due to its connection between enclosure 150 and housing 112. In this manner, lock ring 128B attached to flange 119B only compresses output coupling tube 160 against housing 112 and lock ring 158 attached to flange 159 only compresses output coupling tube 160 against enclosure 150.

Figure 2:
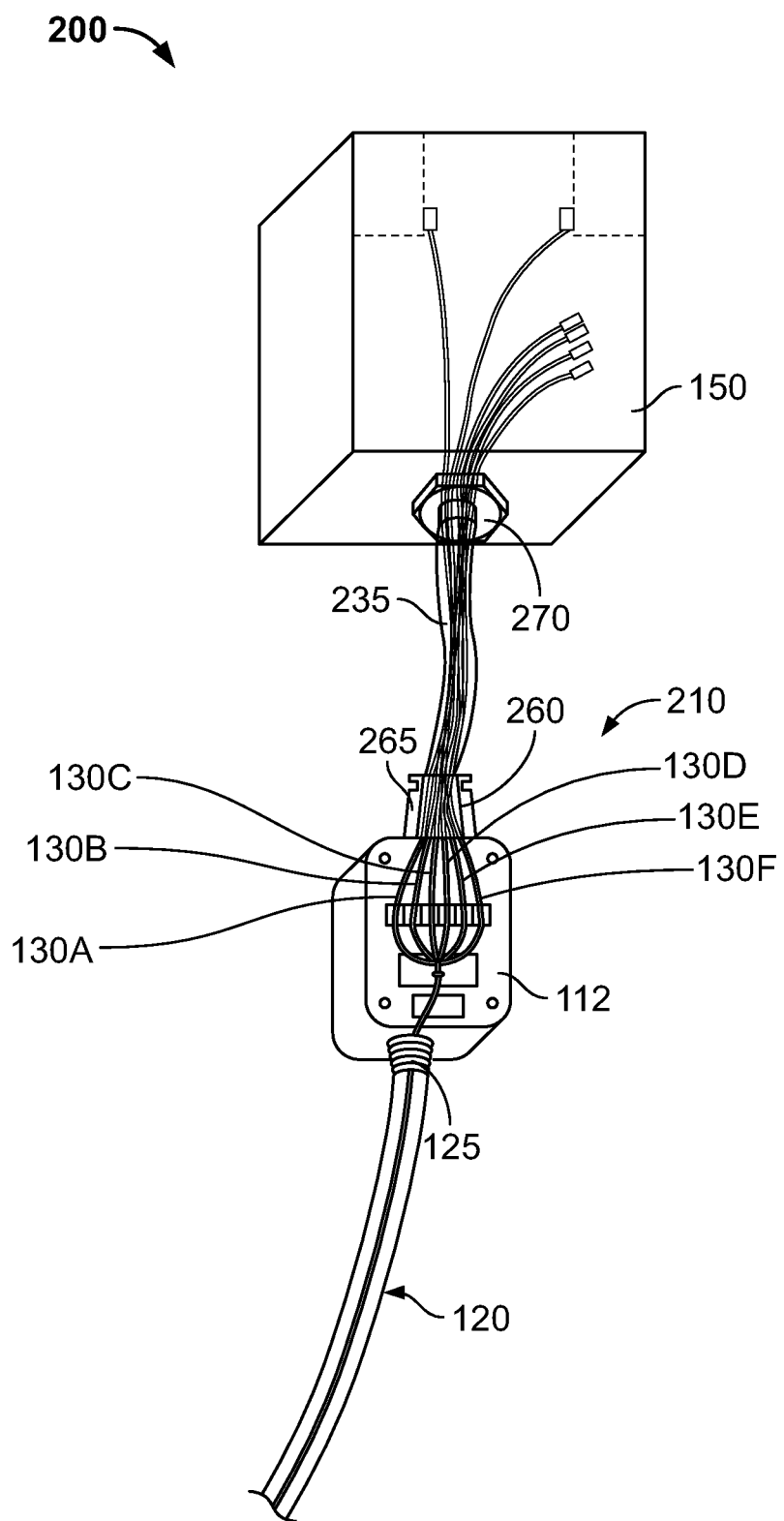
FIG. 2 is a perspective view of an optical fiber termination system in accordance with another embodiment.

Referring now to FIG. 2, optical fiber termination system 200 may include optical fiber cable and termination unit assembly 210 and enclosure 150. Assembly 210 is the same as optical fiber cable and termination unit assembly 110 with the notable exception that output coupling tube 160 is replaced by output outer sheath 235, cable connector 270, output inner coupling tube or element 260, and output outer coupling tube or element 265. As shown, in this example, the plurality of output optical fibers 130A-130F extend from housing 112 through output outer sheath 235 and cable connector 270 which may be attached to enclosure 150 via a screw connection or other modes of attachment known to those of ordinary skill in the art.

Output inner coupling tube 260, which is substantially similar to input coupling tube 125 may interface with housing 112 in the same or substantially the same manner as input coupling tube 125 and output coupling tube 160 of input optical fiber cable 120 described previously herein. In this manner, output inner coupling tube 260 may abut or nearly abut housing 112 in forming a watertight seal against the housing about an entire perimeter of the output hole through the housing through which the plurality of output optical fibers 130A-130F extend. Output outer coupling tube 265 may act as a boot that covers a portion of output inner coupling tube 260 adjacent to the location at which the plurality of output optical fibers 130A-130F extend from housing 112. Output outer coupling tube 265 may include a neck at a location spaced from housing 112 that may have a smaller perimeter than other sections of the outer coupling tube along its length. In this manner, the neck of outer coupling tube 265 may conform to a perimeter of output outer sheath 235 or a perimeter of output inner coupling tube 260, or both, to form a watertight seal.

Referring now to FIG. 3, optical fiber termination system 200A may include optical fiber cable and termination unit assembly 210A and enclosure 150. Assembly 210A is the same as optical fiber cable and termination unit assembly 210 with the notable exception that, output inner coupling tube or element 260 is replaced by output inner coupling tube 260A, and output outer coupling tube or element 265 is replaced by output outer coupling tube 266. Output inner coupling tube 260A is the same as or substantially the same as output inner coupling tube 260 with the exception that output inner coupling tube 260A includes groove 262. Output outer coupling tube 266 is shaped such that, when placed properly against housing 112, an end of output outer coupling tube furthest from the housing has a smaller inner diameter than the opposite end of the output outer coupling tube. Output outer coupling tube 266 includes flange 267 that corresponds to groove 262 of output inner coupling tube 260A such that when the output outer coupling tube and the output inner coupling tube are properly seated, flange 267 of the output outer coupling tube is seated in groove 262, as shown in FIG. 3. In this manner, a watertight seal is formed between inner output coupling tube 260A and output outer coupling tube 266.

In use, as to any of the arrangements described previously herein, when a light beam exits from input optical fiber 120, the light beam is split into divided beams by optical splitter 116 which routes the divided beams along respective optical fibers 116A-116F to respective terminals 142A-142F of patch panel terminal 140. Respective terminals 142A-142F then route respective light beams from optical fibers 116A-116F along output optical fibers 130A-130F to fiber optic terminals, such as fiber optic terminals 152, 154, within enclosure 150. The respective light beams from optical fibers 116A-116F may undergo optical signal processing, and also electrical signal processing if converted to respective electric signals, which may include routing through switches, or other electrical or optical pathways, which control routing of the optical and/or electrical signals.

Referring now to the example of FIGS. 4A and 4B, optical fiber cable and termination unit assembly 310, which along with enclosure 150 may form part of an optical fiber termination system, may have the configuration of either optical fiber cable and termination unit assembly 110 or optical fiber cable and termination unit assembly 110 with the exception that assembly 310 includes input coupling element 325. Input coupling element 325 includes outer boot 326, inner boot 327, inner lock ring 328 which may be tapered, and outer lock ring 329 attached to housing 112. Inner boot 327 may be an o-ring as in the example shown or may be integral with outer boot 326 such that the inner and outer boots are inseparable without fracture of either one or both of the inner and outer boots. As shown, inner lock ring 328 and outer lock ring 329 may be attached by a threaded connection. Inner boot 327 may be situated between the taper of the inner lock ring 328 and housing 112 about the input hole of the housing through which input optical fiber cable 320, which may be a "pushable" cable, including connector 321 may extend. In use, a portion of input optical fiber cable 320 may be inserted into input coupling element 325, as shown in FIG. 4A, and then connector 321 of the input optical fiber cable may be inserted into splitter 116 (see FIGS. 1-3). Subsequently, inner lock ring 328 may be rotated to cause the inner lock ring to travel towards an interior surface of housing 112. In this manner, inner lock ring 328, which may be rigid, may compress inner boot 327 causing the inner boot to form a watertight seal around a portion of input optical fiber cable 120, as shown in FIG. 4B. Similarly, the configuration of input coupling element 325 could also be applied to an alternative arrangement of an output coupling element and its interface with housing 112 as well as its interface, or an interface with a separate coupling element having the same configuration, with enclosure 150. In this instance, multiple connectors of respective multiple optical fiber cables like that of input optical fiber cable 320 may be inserted directly into respective terminals of patch panel terminal 140.

In assembling optical fiber termination system 100, 200, an operator, such as but not limited to an optoelectronic technician or an electrician, may connect the plurality of output optical fibers 130A-130F to respective terminals within enclosure 150. The operator may then attach output coupling tube 160 of optical fiber cable and termination unit assembly 110 to enclosure 150, as in the example of optical fiber termination system 100, or attach cable connector 270 of either of optical fiber cable and termination unit assemblies 210, 210A to enclosure 150, as in the example of optical fiber termination systems 200, 210A, respectively.

In some alternative arrangements, optical fiber cable and termination unit assemblies, such as assemblies 110, 210, 210A, 310, may not include input mating device 114 and instead the patch panel terminal of any such assembly may include an additional port through which input optical fiber 122 may be connected to an additional optical fiber, or in similar arrangements with the plurality of input optical fibers 122A-122C, an additional set of ports into which such plurality of input optical fibers may be connected to corresponding additional optical fibers. In such arrangements, the additional optical fiber to which input optical fiber 122 is connected or the additional optical fibers to which the plurality of input optical fibers 122A-122C may be connected to optical splitter 116 operating in the same manner as described previously herein.

In alternative arrangements, the output optical fiber cables may be replaced with electrically conductive wires. In such arrangements, the electrically conductive wires may be electrically connected to the patch panel terminal within the housing of the cable and termination unit assembly and the electronic devices or equipment within the enclosure. In this manner, the patch panel terminal may route or transmit electrical signals or an optical-to-electrical converter (which in some instances may be integrated with the patch panel terminal) optically connected to the patch panel terminal by shortened output optical fibers may route or transmit electrical signals, and in some arrangements electrical power, to respective electronic devices or equipment in the enclosure.

In some alternative arrangements, the input optical fiber cable or the plurality of output optical fibers may be replaced with "pushable" cables as described previously herein with respect to the example of FIGS. 4A, 4B. In such arrangements, the input optical fiber may be inserted directly into the splitter and the plurality of output optical fiber cables may be inserted into respective terminals of the patch panel terminal.

It is to be further understood that the disclosure set forth herein includes any possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the technology, and in the technology generally.

Furthermore, although the technology herein has been described with reference to particular features, it is to be understood that these features are merely illustrative of the principles and applications of the present technology. It is therefore to be understood that numerous modifications, including changes in the sizes of the various features described herein, may be made to the illustrative embodiments and that other arrangements may be devised without departing from the spirit and scope of the present technology. In this regard, the present technology encompasses numerous additional features in addition to those specific features set forth in the claims below. Moreover, the foregoing disclosure should be taken by way of illustration rather than by way of limitation as the present technology is defined by the claims set forth below.

The invention claimed is:

1. An optical fiber cable and termination unit assembly comprising:
   a housing having an interior surface;
   a patch panel terminal coupled to the interior surface of the housing;
   an optical signal assembly;
   an input optical fiber extending into the housing to the optical signal assembly;
   a plurality of output optical fibers extending out of the housing from the patch panel terminal, wherein the optical signal assembly divides a light beam emitted from the optical signal assembly into a plurality of light beams that are received by the patch panel terminal; and
   an input coupling element extending from the housing and defining a first longitudinal axis extending in directions towards and away from the housing, the input optical fiber extending through the input coupling element, wherein the housing defines a first hole through which the input optical fiber cable extends, the input coupling element contacting the housing around an entire perimeter of the first hole to form a watertight seal at an interface of the input coupling element and the housing.

2. The assembly of claim 1, further comprising an output coupling element extending from the housing and defining a second longitudinal axis extending in directions towards and away from the housing, the plurality of output optical fibers extending through the output coupling element, wherein the housing defines a second hole through which the plurality of output optical fibers extends, the output coupling element contacting the housing around an entire perimeter of the second hole to form a watertight seal at an interface of the output coupling element and the housing.

3. The assembly of claim 2, wherein the output coupling element includes an output coupling flange extending from an end of the output coupling element in a direction transverse to the second longitudinal axis, and wherein an entire perimeter of the output coupling flange is adhered to the interior surface of the housing to form the watertight seal.

4. The assembly of claim 2, wherein the plurality of output optical fibers extend through an outer sheath, and wherein the outer sheath extends through the output coupling element.

5. The assembly of claim 2, wherein the output coupling element defines an output coupling groove around an entire perimeter of the output coupling element, and wherein the housing extends into the output coupling groove at the second hole in an interference fit to form the watertight seal.

6. The assembly of claim 1, wherein the input optical fiber extends through an outer sheath, the outer sheath extending through the input coupling element, wherein the input coupling element comprises:
   an outer boot against an exterior surface opposite the interior surface of the housing;
   an inner boot adjacent to the interior surface of the housing;
   an inner lock ring; and an outer lock ring attached to the housing and forming a threaded connection with the inner lock ring, wherein upon threading the inner lock ring in a direction towards the housing, the inner boot is compressed by the inner lock ring against the outer sheath of the input coupling element to form the watertight seal.

7. The assembly of claim 1, wherein the input coupling element includes an input coupling flange extending from an end of the input coupling element in a direction transverse to the first longitudinal axis, and wherein an entire perimeter of the input coupling flange is adhered to the interior surface of the housing to form the watertight seal.

8. The assembly of claim 1, wherein the input coupling element is molded onto the housing around the entire perimeter of the first hole such that the input coupling element is inseparable from the housing without fracture of either one or both of the input coupling element and the housing.

9. The assembly of claim 1, wherein the input coupling element defines an input groove around an entire perimeter of the input coupling element, and wherein the housing extends into the input groove at the first hole in an interference fit to form the watertight seal.

10. The assembly of claim 1, wherein the optical signal assembly includes an optical splitter or an optical wavelength division multiplexer.

11. The assembly of claim 1, wherein the cable and termination unit assembly is an outside plant (OSP) cable assembly.

12. The assembly of claim 1, wherein a plurality of intermediate optical fibers are connected to the patch panel terminal and the optical signal assembly, wherein the plurality of light beams received by the patch panel terminal travel along respective ones of the plurality of intermediate optical fibers.

13. An optical fiber termination system, further comprising:
 the optical fiber cable and termination unit assembly of claim 1;
 an enclosure separate from the housing of the optical fiber cable and termination unit assembly;
 a plurality of electronic or optical devices within the enclosure, wherein the plurality of output optical fibers are configured to convey respective light beams to any one or any combination of the plurality of electronic and optical devices in the enclosure.

14. The system of claim 13, wherein the plurality of electronic or optical devices include any one or any combination of an antenna, a kiosk terminal, and optical switch.

15. The system of claim 13, wherein the optical fiber cable and termination unit assembly further includes an output coupling element and an input coupling element both extending from the housing, the plurality of output optical fibers extending through the output coupling element and the input optical fiber extending through the input coupling element, and wherein the enclosure includes an enclosure hole, and wherein the output coupling element contacts the enclosure around an entire perimeter of the enclosure hole to form a watertight seal at an interface of the output coupling element and the enclosure.

16. The system of claim 15, wherein the plurality of output optical fibers extend through an outer sheath and a cable connector, and wherein the outer sheath extends through the output coupling element to the cable connector, the cable connector being attached to the enclosure.

17. An optical fiber cable and termination unit assembly comprising:
 a housing having an interior surface;
 a patch panel terminal coupled to the interior surface of the housing;
 an optical signal assembly;
 an input optical fiber extending into the housing to the optical signal assembly;
 a plurality of output optical fibers extending out of the housing from the patch panel terminal, wherein the optical signal assembly divides a light beam emitted from the optical signal assembly into a plurality of light beams that are received by the patch panel terminal;
 an output coupling element extending from the housing and defining a first longitudinal axis extending in directions towards and away from the housing, the plurality of output optical fibers extending through the output coupling element, wherein the housing defines a first hole through which the plurality of output optical fibers extends, the output coupling element contacting the housing around an entire perimeter of the first hole to form a watertight seal at an interface of the output coupling element and the housing, wherein the output coupling element includes an output coupling flange extending from an end of the output coupling element in a direction transverse to the first longitudinal axis, and wherein an entire perimeter of the output coupling flange is adhered to the interior surface of the housing to form the watertight seal.

18. An optical fiber cable and termination unit assembly comprising:
 a housing having an interior surface;
 a patch panel terminal coupled to the interior surface of the housing;
 an optical signal assembly;
 an input optical fiber extending into the housing to the optical signal assembly;
 a plurality of output optical fibers extending out of the housing from the patch panel terminal, wherein the optical signal assembly divides a light beam emitted from the optical signal assembly into a plurality of light beams that are received by the patch panel terminal;
 an output coupling element extending from the housing and defining a first longitudinal axis extending in directions towards and away from the housing, the plurality of output optical fibers extending through the output coupling element,
 wherein the housing defines a first hole through which the plurality of output optical fibers extends, the output coupling element contacting the housing around an entire perimeter of the first hole to form a watertight seal at an interface of the output coupling element and the housing, and
 wherein the output coupling element is molded onto the housing around an entire perimeter of the first hole such that the output coupling element is inseparable from the housing without fracture of either one or both of the output coupling element and the housing.

19. An optical fiber cable and termination unit assembly comprising:
 a housing having an interior surface;
 a patch panel terminal coupled to the interior surface of the housing;
 an optical signal assembly;
 an input optical fiber extending into the housing to the optical signal assembly;
 a plurality of output optical fibers extending out of the housing from the patch panel terminal, wherein the optical signal assembly divides a light beam emitted from the optical signal assembly into a plurality of light beams that are received by the patch panel terminal;

an output coupling element extending from the housing and defining a first longitudinal axis extending in directions towards and away from the housing, the output coupling element comprising:
 an outer boot against an exterior surface opposite the interior surface of the housing;
 an inner boot adjacent to the interior surface of the housing;
 an inner lock ring; and
 an outer lock ring attached to the housing and forming a threaded connection with the inner lock ring; and an outer sheath extending through the output coupling element, wherein the housing defines a first hole through which the plurality of output optical fibers extends, the output coupling element contacting the housing around an entire perimeter of the first hole to form a watertight seal at an interface of the output coupling element and the housing, wherein the plurality of output optical fibers extends through the output coupling element and the outer sheath, and wherein upon threading the inner lock ring in a direction towards the housing, the inner boot is compressed by the inner lock ring against the outer sheath to form the watertight seal.

20. The assembly of claim 19, wherein the output coupling element includes a neck at a location spaced from the housing and having a smaller inner perimeter than other sections of the output coupling element, and wherein the neck conforms to a perimeter of the outer sheath to form the watertight seal.

21. An optical fiber cable and termination unit assembly comprising:
 a housing having an interior surface;
 a patch panel terminal coupled to the interior surface of the housing;
 an optical signal assembly;
 an input optical fiber extending into the housing to the optical signal assembly;
 a plurality of output optical fibers extending out of the housing from the patch panel terminal, wherein the optical signal assembly divides a light beam emitted from the optical signal assembly into a plurality of light beams that are received by the patch panel terminal;
 an output coupling element extending from the housing, the output coupling element defining a first longitudinal axis extending in directions towards and away from the housing and defining an output coupling groove around an entire perimeter of the output coupling element, the plurality of output optical fibers extending through the output coupling element, wherein the housing defines a first hole through which the plurality of output optical fibers extends, the output coupling element contacting the housing around an entire perimeter of the first hole to form a watertight seal at an interface of the output coupling element and the housing, and wherein the housing extends into the output coupling groove at the first hole in an interference fit to form the watertight seal.

* * * * *